(12) United States Patent
Gurumurthi

(10) Patent No.: US 11,880,769 B2
(45) Date of Patent: Jan. 23, 2024

(54) USING MULTIPLE FUNCTIONAL BLOCKS FOR TRAINING NEURAL NETWORKS

(71) Applicant: Advanced Micro Devices, Inc., Santa Clara, CA (US)

(72) Inventor: Sudhanva Gurumurthi, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 772 days.

(21) Appl. No.: 16/191,359

(22) Filed: Nov. 14, 2018

(65) Prior Publication Data
US 2020/0151572 A1    May 14, 2020

(51) Int. Cl.
*G06N 3/084* (2023.01)
*G06N 3/04* (2023.01)
*G06N 3/065* (2023.01)

(52) U.S. Cl.
CPC ............. *G06N 3/084* (2013.01); *G06N 3/04* (2013.01); *G06N 3/065* (2023.01)

(58) Field of Classification Search
CPC ............ G06N 3/084; G06N 3/04; G06N 3/08; G06N 3/063
See application file for complete search history.

(56) References Cited

U.S. PATENT DOCUMENTS

| | | | |
|---|---|---|---|
| 9,646,243 B1* | 5/2017 | Gokmen | G06N 3/08 |
| 2005/0125369 A1* | 6/2005 | Buck | G06K 9/00986 |
| | | | 706/12 |
| 2016/0174902 A1* | 6/2016 | Georgescu | G06T 7/0012 |
| | | | 600/408 |
| 2017/0206464 A1* | 7/2017 | Clayton | G06N 3/0445 |
| 2018/0075338 A1* | 3/2018 | Gokmen | G06N 3/0454 |
| 2018/0322606 A1* | 11/2018 | Das | G06T 1/20 |
| 2019/0303143 A1* | 10/2019 | Beard | G06F 9/30098 |
| 2019/0325291 A1* | 10/2019 | Gokmen | G06N 3/0454 |

(Continued)

OTHER PUBLICATIONS

Zhang, Q., et al. "Sign backpropagation: An on-chip learning algorithm for analog RRAM neuromorphic computing systems." Neural Networks: the Official Journal of the International Neural Network Society 108 (Sep. 2018): 217-223. (Year: 2018).*

(Continued)

*Primary Examiner* — Alan Chen
*Assistant Examiner* — Randall K. Baldwin
(74) *Attorney, Agent, or Firm* — Park, Vaughan, Fleming & Dowler LLP

(57) ABSTRACT

A system is described that performs training operations for a neural network, the system including an analog circuit element functional block with an array of analog circuit elements, and a controller. The controller monitors error values computed using an output from each of one or more initial iterations of a neural network training operation, the one or more initial iterations being performed using neural network data acquired from the memory. When one or more error values are less than a threshold, the controller uses the neural network data from the memory to configure the analog circuit element functional block to perform remaining iterations of the neural network training operation. The controller then causes the analog circuit element functional block to perform the remaining iterations.

18 Claims, 4 Drawing Sheets

(56) References Cited

U.S. PATENT DOCUMENTS

2020/0012924 A1* 1/2020 Ma .................. G06V 10/764
2020/0117997 A1* 4/2020 Yao .................. G06N 3/0635

OTHER PUBLICATIONS

Ambrogio, Stefano, et al. "Equivalent-accuracy accelerated neural-network training using analogue memory." Nature 558.7708 (Jun. 2018): 60-67. (Year: 2018).*

Yu, Shimeng. "Neuro-inspired computing with emerging nonvolatile memorys." Proceedings of the IEEE 106.2 (Feb. 2018): 260-285. (Year: 2018).*

Walcott, Kristen R., Greg Humphreys, and Sudhanva Gurumurthi. "Dynamic prediction of architectural vulnerability from microarchitectural state." Proceedings of the 34th Annual International Symposium on Computer Architecture. 2007. (Year: 2007).*

Rhu, Minsoo, et al. "vDNN: Virtualized deep neural networks for scalable, memory-efficient neural network design." 2016 49th Annual IEEE/ACM International Symposium on Microarchitecture (MICRO). IEEE, 2016. (Year: 2016).*

Zhu, Hongyu, et al. "Tbd: Benchmarking and analyzing deep neural network training." arXiv preprint arXiv: 1803.06905 (Apr. 2018): 1-36 (Year: 2018).*

Mittal, Sparsh. "A survey of ReRAM-based architectures for processing-in-memory and neural networks." Machine learning and knowledge extraction 1.1 (Apr. 2018): 75-114. (Year: 2018).*

Xia, Lixue, et al. "Fault-tolerant training enabled by on-line fault detection for RRAM-based neural computing systems." IEEE Transactions on Computer-Aided Design of Integrated Circuits and Systems 38.9 (Jul. 2018): 1611-1624. (Year: 2018).*

Zhang, Jilin, et al. "An adaptive synchronous parallel strategy for distributed machine learning." IEEE Access 6 (Apr. 2018): 19222-19230. (Year: 2018).*

Erkmen, Burcu, et al. "Conic section function neural network circuitry for offline signature recognition." IEEE transactions on neural networks 21.4 (2010): 667-672. (Year: 2010).*

Yang, Changju, et al. "A circuit-based neural network with hybrid learning of backpropagation and random weight change algorithms." Sensors 17.1 (2016): 16: 1-18 (Year: 2016).*

Krestinskaya, Olga, Khaled Nabil Salama, and Alex Pappachen James. "Learning in Memristive Neural Network Architectures using Analog Backpropagation Circuits." arXiv preprint arXiv:1808.10631 (Aug. 2018): 1-14 (Year: 2018).*

Koster, U. et al., Flexpoint: An Adaptive Numerical Format for Efficient Training of Deep Neural Networks, arXiv:1711.02213 [cs.LG], Nov. 2017, accessed on the Internet at https://arxiv.org/abs/1711.02213, last accessed Nov. 2018.

Tsai, H. et al., Recent Progress in Analog Memory-based Accelerators for Deep Learning, Journal of Physics D: Applied Physics 51, Feb. 2018.

* cited by examiner

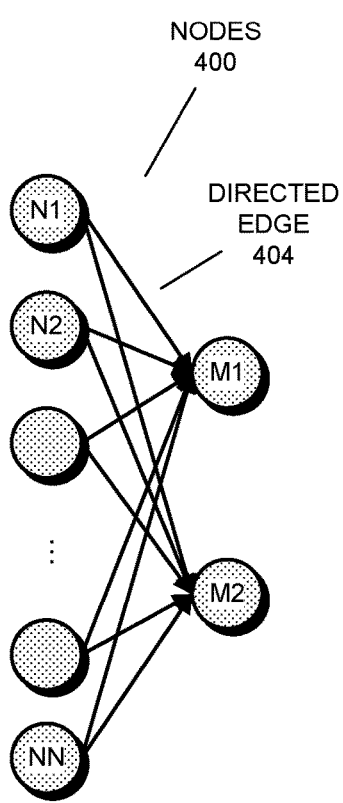
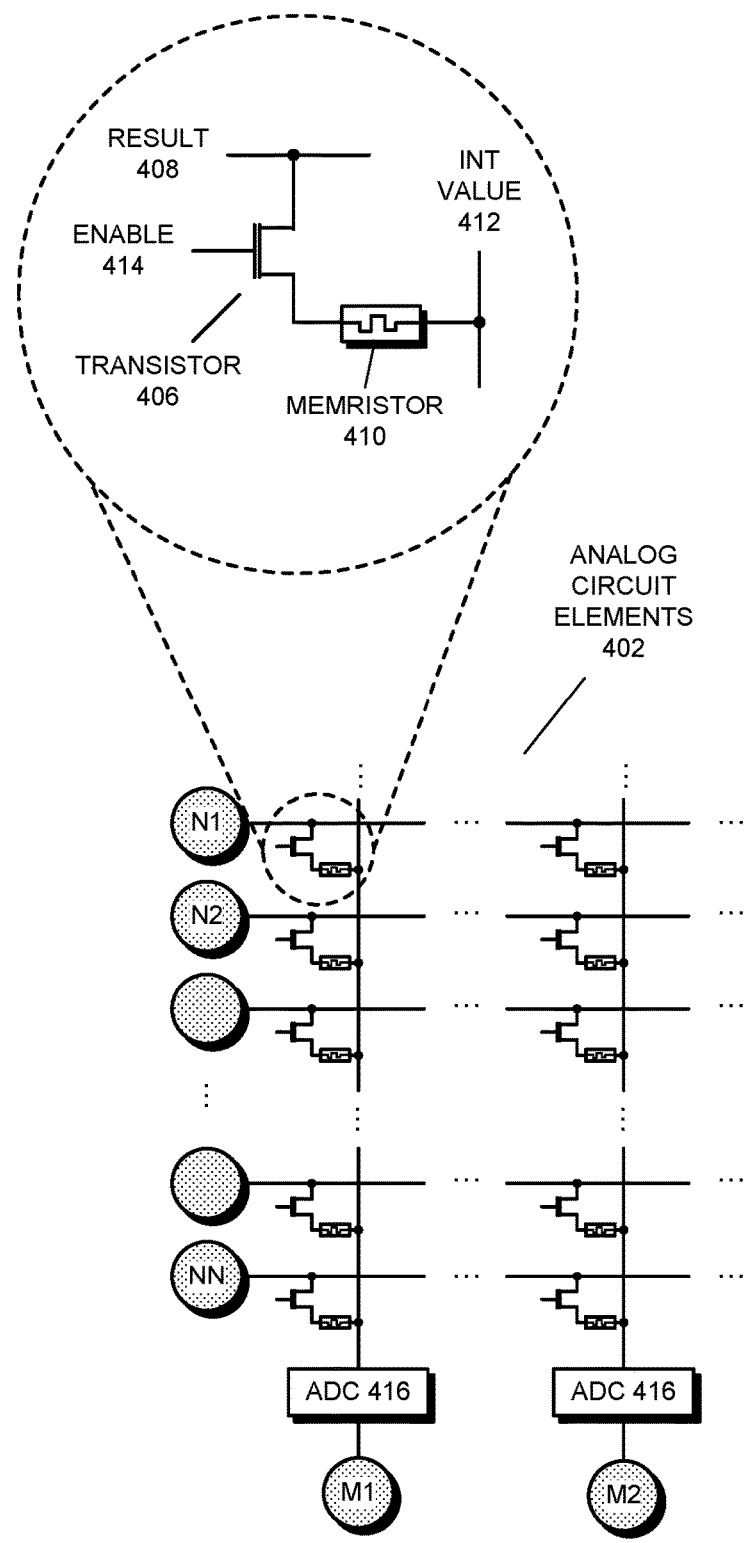
FIG. 4A
FIG. 4B

USING MULTIPLE FUNCTIONAL BLOCKS FOR TRAINING NEURAL NETWORKS

BACKGROUND

Related Art

Some electronic devices perform operations for artificial neural networks or, more simply, "neural networks." Generally, a neural network is a computational structure that includes internal elements having similarities to biological neural networks, such as those in a living creature's brain. Neural networks can be trained to perform various types of operations. The training is performed by using known data to configure the internal elements of the neural network so that the neural network can then perform a specified task on unknown data. For example, a neural network may be trained by using digital images that are known to include (or not) images of faces to configure the internal elements of the neural network to react appropriately when subsequently analyzing digital images to determine whether the digital images include images of faces.

Neural networks include, in their internal elements, a set of artificial neurons, or "nodes," that are interconnected to one another in an arrangement similar to how neurons are interconnected via synapses in a living creature's brain. A neural network can be visualized as a form of weighted graph structure in which the nodes include input nodes, intermediate nodes, and output nodes. Within the neural network, each node other than the output nodes is connected to one or more downstream nodes via a directed edge that has an associated weight, where a directed edge is an interconnection between two nodes on which information travels in a specified direction. During operation, the input nodes receive inputs from an external source and process the inputs to produce input values. The input nodes then forward the input values to downstream intermediate nodes. The receiving intermediate nodes weight the received inputs based on a weight of a corresponding directed edge, i.e., adjust the received inputs such as multiplying by a weighting value, etc. Each intermediate node sums the corresponding weighted received inputs to generate an internal value and processes the internal value using an activation function of the intermediate node to produce a result value. The intermediate nodes then forward the result values to downstream intermediate nodes or output nodes, where the result values are weighted in accordance with a weight associated with the corresponding directed edge and processed thereby. In this way, the output nodes generate outputs for the neural network. Continuing the image processing example above, the outputs from the output nodes (and thus from the neural network) may be in a form that indicates whether or not a digital image includes an image of a face, such as being a value from 0, for very unlikely to include an image of a face, to 1, for very likely to include an image of a face.

As described above, values forwarded along directed edges between nodes in a neural network are weighted in accordance with a weight associated with each directed edge. By setting the weights associated with the directed edges during a training operation so that desired outputs are generated by the neural network, the neural network can be trained to produce intended outputs such as the above-described identification of faces in digital images. When training a neural network, numerous instances of input data having expected or desired outputs are processed in the neural network to produce actual outputs from the output nodes. Continuing the neural network example above, the instances of input data would include digital images that are known to include (or not) images of faces, and thus for which the neural network is expected to produce outputs that indicate that a face is likely present (or not) in the images. After each instance of input data is processed in the neural network to produce an actual output, an error value, or "loss," between the actual output and a corresponding expected output is calculated using mean squared error, log loss, or another algorithm. The loss is then worked backward through the neural network, or "backpropagated" through the neural network, to adjust the weights associated with the directed edges in the neural network in order to reduce the error for the instance of input data, thereby adjusting the neural network's response to that particular instance of input data—and all subsequent instances of input data. For example, one backpropagation technique involves computing a gradient of the loss with respect to the weight for each directed edge in the neural network. Each gradient is then multiplied by a training coefficient or "learning rate" to compute a weight adjustment value. The weight adjustment value is next used in calculating an updated value for the corresponding weight, e.g., added to an existing value for the corresponding weight.

In some cases, training operations for neural networks are performed in a general-purpose processor such as a graphics processing unit (GPU). A GPU typically includes numerous separate compute units that execute program code for the training operations, such as matrix multiply and accumulate operations, computations of gradients, etc. Because such processors can perform operations with relatively high precision, in terms of numbers of bits in operands and results, training can be more accurate and/or performed in fewer iterations. These processors face limitations, however, in terms of access bandwidth of memories for acquiring the neural network data used during the training operation, i.e., weights associated with directed edges, node results, etc. In addition, processors and memories consume significant electrical power during operation.

As an alternative to performing training operations for neural networks using the above-described general-purpose processors, designers have proposed using analog circuit elements for performing training operations. For example, memristors, phase-change elements, and other analog circuit elements can be used to perform the summing of weighted input values that is used for computing internal values when processing instances of input data through the neural network—i.e., for performing what has typically been done using multiply and accumulate operations in other types of processors. For such operations, the memristors are arranged in an array (or other connectivity) and the individual memristors in the array are assigned to separate directed edges in the neural network. A conductance of each memristor is then set to a value corresponding to a weight of the respective directed edge. When a voltage proportional to an output of an associated previous node is driven to each memristor, a current flows through the memristor. By summing currents produced by the memristors assigned to the directed edges to a given node, an internal value for the given node is determined (i.e., a value proportional to the sum of the weighted inputs to the given node). The internal value can then be converted to digital form and processed through an activation function in separate computational circuitry to generate the output for the given node. This process continues for all the nodes of the neural network until an output is generated by the output nodes of the neural network. An error value is next computed based on the output from the neural network and backpropagated through the neural network to adjust the conductances of the memristors. Although using the analog circuit elements can be considerably faster and consume less electrical energy than using processors for performing the equivalent operations, analog circuit elements such as memristors can wear out and become unreliable when large numbers of conductance changes, and particularly larger-value conductance changes (as may be seen in early training iterations), are made to the analog circuit elements. In addition, analog circuit elements, while sufficient to train the neural network, lack the precision of processor computations, which means that more iterations may be needed to converge on a trained state for neural networks during training—which exacerbates the above-described issues with conductance adjustments.

BRIEF DESCRIPTION OF THE FIGURES

FIG. 4A presents a block diagram illustrating nodes in a neural network in accordance with some embodiments.

FIG. 4B presents a block diagram illustrating analog circuit elements associated with nodes in a neural network in accordance with some embodiments.

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of one of these terms. Note that the term may have significant additional aspects that are not recited herein for clarity and brevity and thus the description is not intended to limit the term.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element, etc. A functional block can include any number of circuit elements, from a single circuit element (e.g., a single integrated circuit logic gate) to millions or billions of circuit elements (e.g., an integrated circuit memory).

Neural Network

Figure 1:
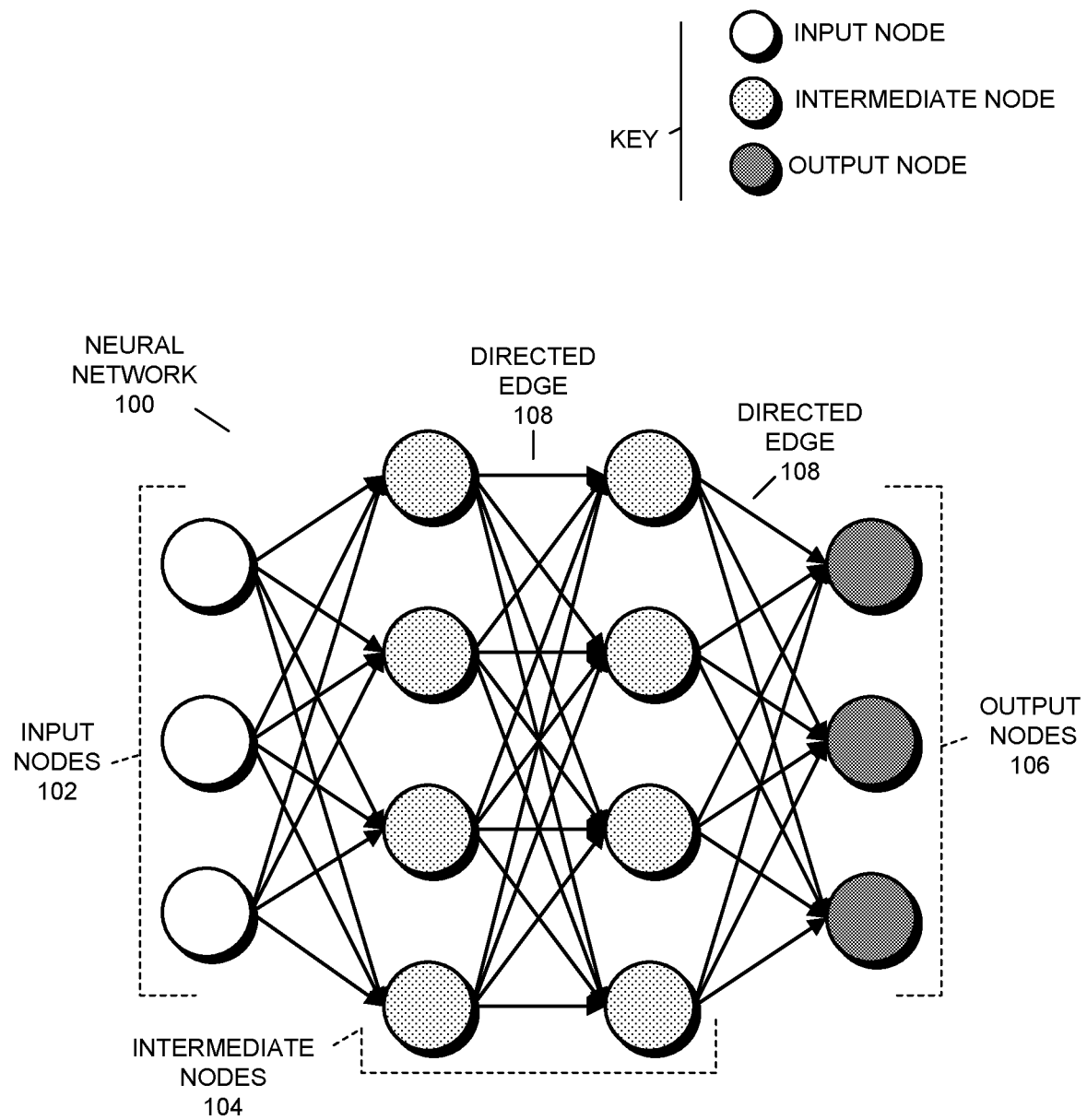
FIG. 1 presents a block diagram illustrating a neural network in accordance with some embodiments.

As described above, a neural network is a computational structure that includes internal elements (i.e., nodes, etc.) that are trained to perform specified tasks, such as image or audio recognition (or "classification"), image or audio generation, etc. FIG. 1 presents a block diagram illustrating a neural network 100 including input nodes 102, intermediate nodes 104, output nodes 106, and directed edges 108 in accordance with some embodiments (only two directed edges are labeled for clarity).

Depending on the nature of the internal elements of neural network 100, neural network 100 can be a "discriminative" network or a "generative" network. A discriminative network is a neural network that is configured to process instances of input data and output results that indicate whether specified patterns are likely to be present in the instances of input data—i.e., to "classify" instances of input data. For example, a discriminative network may be configured to output results indicating whether faces or road signs are likely present in digital images, whether particular sounds or words are likely present in digital audio, etc. A generative network is a neural network that is configured to generate instances of output data that include patterns having similarity to specified patterns. For example, the generative network may be configured to generate digital images that include patterns similar to faces or road signs, audio that includes patterns similar to particular sounds or words, etc.

Although an example of a neural network is presented in FIG. 1, in some embodiments, a different arrangement of nodes and/or layers or levels is present in the neural network. For example, a neural network can include a number—and in some cases, millions or billions—of intermediate nodes arranged in a large number of layers or levels, each layer or level of intermediate nodes receiving input values and forwarding generated result values to intermediate nodes in the next layer or level or to output nodes. As another example, in some embodiments, a different topography or connectivity of nodes is used and/or different types of nodes are used, such as the arrangements and types of nodes used in neural networks including radial basis networks, recurrent neural networks, auto encoders, Markov chains, deep belief networks, deep convolutional networks, deep residual networks, etc. Generally, the described embodiments are operable with any configuration of neural network(s) for which training operations can be performed as described herein.

Overview

In the described embodiments, a system that includes a processor, a memory, and an analog circuit element functional block performs training operations for a neural network. The training operations include performing a number of training iterations, each iteration involving processing an instance of input data through the neural network to generate an output from the neural network and then using an error value that is computed based on the output to update weights for directed edges in the neural network. The system uses the processor and memory for performing initial iterations (which can include thousands or millions of iterations), then, as the neural network grows nearer to a trained state, switches to using the analog circuit element functional block for performing remaining iterations (which can also include thousands or millions of iterations). By doing this, the system switches to using the analog circuit element functional block for later iterations where the benefits of using the processor and memory (e.g., higher precision, etc.) are overcome by the benefits of using the analog circuit element functional block (e.g., lower electrical power consumption, faster processing, etc.).

As described above, the system uses the processor and memory for performing initial iterations of the training operations. For these iterations, the processor executes program code that causes the processor to process instances of input data through the neural network to generate outputs, compute the error values from the outputs, determine updates to weights for directed edges in the neural network based on the error value, etc. For example, the processor may perform a number of multiply and accumulate operations for determining internal values (sums of weighted inputs) for nodes when processing instances of input data through the neural network, etc. When performing the initial iterations, the processor also reads neural network data (e.g., weight values, etc.) from the memory and writes neural network data (e.g., updated weight values, etc.) to the memory.

While the processor and memory perform the initial iterations, a controller in the system monitors the error value computed (e.g., using mean squared error, etc.) for some or all of the instances of input data. When one or more error values are lower than a threshold, the controller causes the system to switch from using the processor and memory to using the analog circuit element functional block for performing remaining iterations. As part of the switch, the system copies or transfers neural network data from the memory to the analog circuit element functional block to prepare/configure the analog circuit element functional block for performing the remaining iterations. Generally, the copy/transfer operation involves using the neural network data from the memory to configure analog circuit elements and possibly other computational functional blocks within the analog circuit element functional block to use analog processing to perform the remaining iterations. In some embodiments, the analog circuit elements include programmable elements (e.g., memristors, phase-change elements, etc.) and the configuration of the analog circuit elements includes setting programmable values of the programmable elements (e.g., conductances, capacitances, etc.) based at least in part on weights for directed edges in the neural network.

The system then uses the analog circuit element functional block to perform the remaining iterations. For the remaining iterations, the analog circuit elements in the analog circuit element functional block are used for determining weighted inputs/internal values for nodes when processing instances of input data through the neural network. Other processing circuits in the analog circuit element functional block perform operations for using the inputs from the analog circuit elements to evaluate activation functions for nodes, generating outputs from the neural network, computing the error values from the outputs, determining updates to weights for directed edges in the neural network based on the error value, etc. In some embodiments, the other processing circuits also update the programmable values of the programmable elements in the analog circuit elements based at least in part on the determined updates for the weights for directed edges in the neural network. When performing the remaining iterations, the analog circuit element functional block does not access the memory for neural network data, as all values are included in the analog circuit elements and/or the other processing circuits (e.g., in memory locations, registers, etc.) when the above-described switch is made.

In some embodiments, the processor, the memory, and the analog circuit element functional block are included in an accelerator (i.e., are functional blocks are fabricated on, coupled to, or otherwise part of the accelerator). The accelerator can be a specialized functional block for performing training operations for neural networks. In some embodiments, the processor and/or the memory are general-purpose—and thus may be used for operations in addition to the neural network training operations (e.g., executing application program code, etc.).

In some embodiments, the system places one or both of the processor and the memory in a lower-power mode while the remaining iterations are performed in the array of analog circuit elements. For example, a controlling clock may be reduced in frequency or halted for one or both of the processor and the memory (or some portion thereof), a supply voltage may be reduced for one or both of the processor and the memory, etc.

By using the processor and the memory for performing the initial iterations, the described embodiments can use higher-precision operands and result values, which can mean that the neural network approaches the trained state (in which the weights for directed edges and other values are set to operational values) in fewer iterations. In addition, by not using the analog circuit elements for performing the initial iterations, the described embodiments avoid wear on the analog circuit elements—wear that is exacerbated by the larger-scale changes to programmable elements that are typically made during the initial iterations (e.g., larger changes in conductances, etc.). By switching to using the analog circuit elements for performing the remaining iterations, the described embodiments enable a significant sub-operation, i.e., the determination of weighted inputs/internal values for nodes, to be performed in a circuit that consumes less electrical power—and enables power-gating of the processor and/or the memory, for a further electrical power savings. In addition, by moving the remaining iterations to the analog circuit elements, the system avoids the need for accessing memory to read and write neural network data, which removes a bottleneck from these iterations—and can thus mean that the iterations are performed more quickly. The above-described benefits result in improved overall performance for the system, which in turn results in increased user satisfaction with the system.

System

Figure 2:
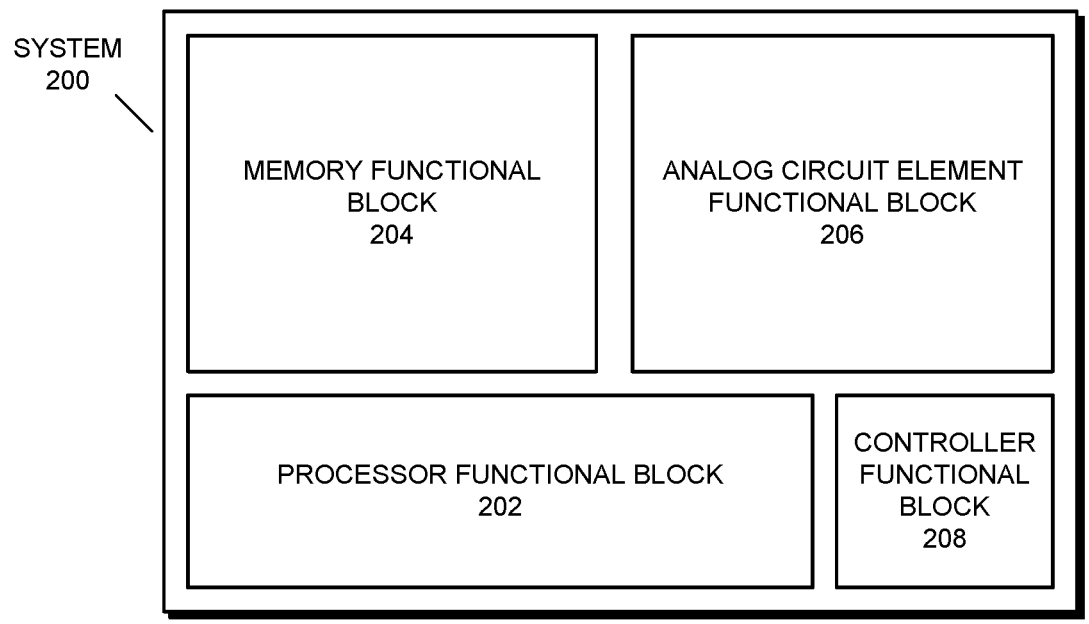
FIG. 2 presents a block diagram illustrating a system in accordance with some embodiments.

In the described embodiments, a system performs operations for switching iterations of a training operation for a neural network from a processor and a memory, which perform initial iterations, to an analog circuit element functional block, which performs remaining iterations. FIG. 2 presents a block diagram illustrating a system 200 in accordance with some embodiments. As can be seen in FIG. 2, system 200 includes processor functional block 202, memory functional block 204, analog circuit element functional block 206, and controller functional block 208.

Processor functional block 202 is a functional block that performs computational operations in system 200. For example, processor functional block 202 may be or include one or more central processing unit (CPU) cores, graphics processing unit (GPU) cores, application specific integrated circuits (ASICs), field programmable gate arrays (FPGAs), etc. In some embodiments, processor functional block 202 includes circuit elements such as pipelines, execution units, compute units, etc. that execute program code that causes the circuit elements to perform associated operations. In some embodiments, processor functional block 202 includes hardware circuits that are dedicated to (and possibly purpose-specific for) performing specified processing operations.

In the described embodiments, processor functional block 202 performs, along with other operations, training operations for a neural network. The nature of these operations depends on the arrangement of the neural network, but includes operations such as computing initial weight values for directed edges in neural networks, determining input values for input nodes of neural networks, computing internal values for nodes of neural networks, evaluating activation functions for nodes using corresponding internal values, backpropagating error values through the neural network to adjust weight values for directed edges, etc.

Memory functional block 204 is functional block in system 200 that performs operations of a memory for system 200. Memory functional block 204 includes memory circuits such as fourth-generation double data rate synchronous dynamic random access memory (DDR4 SDRAM), static random access memory (SRAM), and/or other types of memory circuits for storing data and instructions for use by functional blocks in system 200 and control circuits for handling accesses of the data and instructions that are stored in the memory circuits and for performing other control or configuration operations. In some embodiments, while performing the initial iterations, processor functional block 202 reads neural network data (e.g., weight values for directed edges, result values, etc.) from memory functional block 204 and writes neural network data (e.g., updated weight values for directed edges, result values, etc.) to memory functional block 204.

Analog circuit element functional block 206 is a functional block that performs training operations for a neural network and possibly other operations. The nature of these operations depends on the arrangement of the neural network, but can include operations such as computing weight values for directed edges in neural networks, determining input values for input nodes of neural networks, computing internal values for nodes of neural networks, evaluating activation functions for nodes using corresponding internal values, backpropagating error values through the neural network to adjust weight values for directed edges, etc. In some embodiments, analog circuit element functional block 206 performs remaining iterations of a neural network training operation that follow initial iterations of the neural network training operation performed by processor functional block 202.

Figure 3:
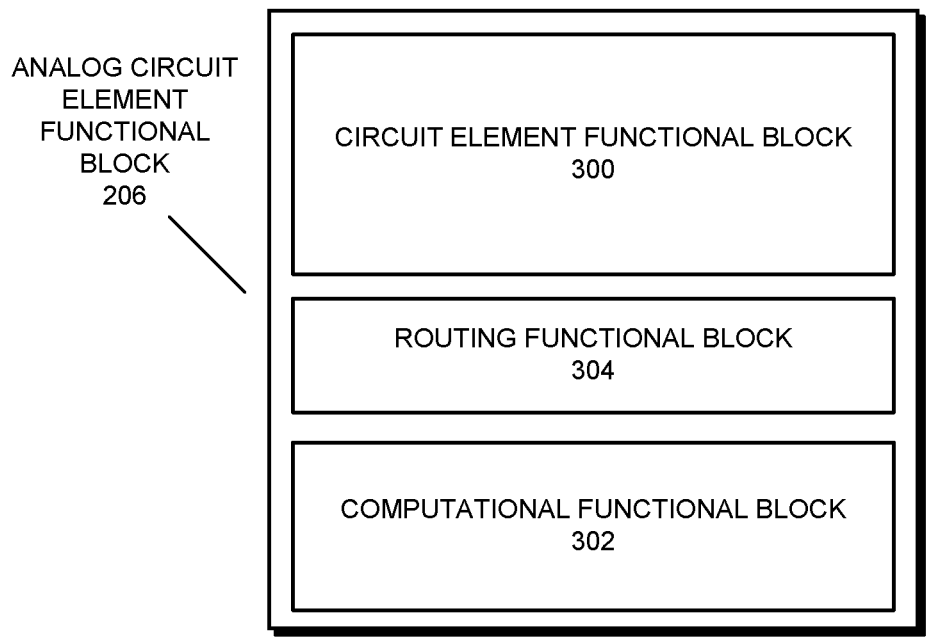
FIG. 3 presents a block diagram illustrating an analog circuit element functional block in accordance with some embodiments.

Analog circuit element functional block 206 includes, among other functional blocks, an array of analog circuit elements that is used for processing instances of input data through the neural network. FIG. 3 presents a block diagram illustrating analog circuit element functional block 206 in accordance with some embodiments. As can be seen in FIG. 3, analog circuit element functional block 206 includes circuit element functional block 300, computational functional block 302, and routing functional block 304.

Circuit element functional block 300 is a functional block that includes an array of analog circuit elements that are used for determining weighted input values/internal values when processing instances of input data through the neural network. As used herein, the "array" of analog circuit elements includes a collection, group, or set of analog circuit elements that are in a specified topology, connectivity, and/or arrangement, which can be or include a set of rows and columns, a tree, etc. Generally, any arrangement of analog circuit elements that can perform the operations described herein may be included in circuit element functional block 300.

An example of an arrangement of the array of analog circuit elements in circuit element functional block 300 is shown in FIG. 4B. FIG. 4A presents a block diagram illustrating a number of nodes 400 from a neural network in accordance with some embodiments. FIG. 4B presents a block diagram illustrating analog circuit elements 402 associated with nodes 400 in accordance with some embodiments. Analog circuit elements 402 includes circuit elements sufficient for computing an internal value for nodes $M_1$ and $M_2$ of nodes 400. (Recall that the internal value is a sum of the weighted input values to a node, which is typically computed in a general-purpose processor such as processor functional block 202 using multiply and accumulate operations.) In some embodiments, circuit element functional block 300 includes, in the array of analog circuit elements, arrangements of elements similar to those shown in analog circuit elements 402 for some or all of the nodes in neural network. Although particular elements and arrangements of elements are shown analog circuit elements 402, these are merely examples; in some embodiments, different elements and/or arrangements of elements are present and/or the elements for different nodes are arranged differently. In addition, the array of analog circuit elements in FIG. 4B is simplified for clarity; in some embodiments, other analog circuit elements and or functional blocks may be present, such as analog circuit elements for processing the logical compliments of result signals, etc. Generally, circuit element functional block 300 includes sufficient analog circuit elements and functional blocks to determine internal values for nodes of a neural network as described herein.

As can be seen in FIG. 4A, nodes 400 includes two layers of intermediate nodes, with intermediate nodes $N_1$-$N_n$ being connected via respective directed edges to intermediate nodes $M_1$ and $M_2$ (only one of the directed edges, directed edge 404, is labeled for clarity). Generally, and as described above, nodes $N_1$-$N_n$ provide result values (computed via activation functions for nodes $N_1$-$N_n$) as inputs for nodes $M_1$ and $M_2$. In nodes $M_1$ and $M_2$, the inputs provided by nodes $N_1$-$N_n$ are weighted in accordance with a weight associated with the corresponding directed edge, the weighted inputs are summed to generate an internal value, and the internal value is processed using an activation function to generate respective result values. The respective result values are then forwarded from nodes $M_1$ and $M_2$ to downstream intermediate nodes or output nodes (not shown) for subsequent processing.

Analog circuit elements 402 in FIG. 4B includes circuit elements and functional blocks that are used for determining an internal value for nodes $M_1$ and $M_2$ in FIG. 4A. Analog circuit elements 402 includes, on the left side and bottom, respectively, inputs associated with intermediate nodes $N_1$-$N_n$, and outputs associated with intermediate nodes $M_1$ and $M_2$, which are shown using labeled circles. In operation, result outputs of nodes $N_1$-$N_n$, are provided to a source (or drain) connection of transistor 406 through a respective result 408 signal line (as shown in an expanded view at the top of FIG. 4B). The opposing drain (or source) connection of transistor 406 is connected to a first connector of memristor 410. The other connector of memristor 410 is connected to the internal (INT) value 412 signal line. Transistor 406 is a transistor such as a p-type or n-type metal oxide silicon field effects transistor (MOSFET) for which a gate connector is connected to an enable 414 signal line. As is known in the art, transistor 406 can be activated and deactivated by asserting a corresponding signal/voltage level on enable 414, and will pass (with some voltage loss from the transistor) the voltage on the result 408 signal line to memristor 410 when activated.

Memristor 410 is a two-terminal circuit element that maintains a value of electrical conductance (or resistance) associated with previously applied current(s) and voltage(s). In other words, memristor 410's conductance varies with applied current and voltage according to an associated memristance expression or function. By controlling the amount of voltage and current that are applied to memristor 410 and the time for which the voltage and current are applied, therefore, a conductance of memristor can be configured to certain desired values. Memristor 410 will then retain the conductance value after the voltage and current are halted (for at least some time). Thus, memristor 410 stores, in the value of its conductance, a representation or record of a "history" of applied voltage(s) and current(s)—and therefore can be considered a form of non-volatile "memory." Based on the configurable and retained, and thus "programmable," nature of the conductance of memristor 410, memristor 410 can also be considered a "programmable element" in analog circuit elements 402.

In order to enable analog circuit elements 402 to be used for determining internal values for nodes when processing instances of input data, the memristors in analog circuit elements 402 are programmed with conductance values based on or representative of weights of corresponding directed edges in the neural network. For example, directed edge 404 in the neural network may be associated with a weight value W and, using a table, a record, an algorithm, etc., computational functional block 302 (or another entity) can determine or compute the conductance C associated with the weight W. Computational functional block 302 can then set the conductance of the associated memristor 410 to conductance C by driving a specified voltage and current (e.g., via the result 408 signal line and transistor 406) through the memristor 410 for a corresponding amount of time. In some embodiments, computational functional block 302, and/or another entity includes dedicated circuitry, e.g., controllers, voltage and/or current sources, timers, dedicated signal lines, switches, etc., that are arranged to perform the programming of the memristors—but which are not shown for clarity.

After the conductances are configured for analog circuit elements 402, and using node $M_1$ as an example, when processing instances of input data, a voltage proportional to a result of each of nodes $N_1$-$N_n$ is driven on the respective result 408 signal line. The enable 414 connected to each transistor 406 for node $M_1$ is asserted, meaning that the voltage (minus transistor losses) from the result 408 signal line is driven to the respective memristor 410. The internal value 412 signal line, which is coupled to a reference voltage such as VSS (e.g., 0 V), receives a current from each of the memristors, the current being caused by the difference in voltage at the two terminals of each memristor 410. The collective current of all the memristors on the internal value 412 signal line feeds to an analog to digital converter (ADC) 416, which produces a digital value for node $M_1$ based on the collective current. The result produced by ADC 416, given the prior configuration of the conductances of the memristors, is proportional to or representative of the sum of the weighted input values to node $M_1$. From ADC 416, the result (i.e., the sum of the weighted input values) is forwarded as the internal value for node $M_1$ to computational functional block 302 for use in evaluating the activation function for node $M_1$.

Note that the determination of internal values using the analog circuit elements as described is significantly faster and requires less electrical power than performing the same computation in processor functional block 202 (e.g., in a general-purpose GPU or CPU). This is true because, in some embodiments, multiple instructions must be executed to compute the corresponding multiply and accumulates in processor functional block 202, the relevant weight values must be acquired by processor functional block 202 from memory functional block 204, etc.

When an instance of input data has been completely processed through the neural network to produce outputs from the neural network, an error value is backpropagated through the neural network as described above. As this applies to analog circuit elements 402, computational functional block 302 (or another entity) computes, based on the error, an adjustment to be made to the weight for directed edges in the neural network. From these weights, using a table, a record, an algorithm, etc., computational functional block 302 (another entity) updates the conductances of associated memristors to corresponding conductance values. As described above, setting the conductance of the associated memristor 410 to conductance C is done by driving a specified voltage and current through the memristor 410 for a corresponding amount of time. As also described above, in some embodiments, circuit element functional block 300, computational functional block 302, and/or another entity includes dedicated circuitry, e.g., controllers, voltage and/or current sources, timers, dedicated signal lines, switches, etc., that are arranged to perform the programming of the memristors—but which is not shown for clarity.

Although circuit element functional block 300 is described using memristors, memristors are merely one example of circuit elements that can be used in analog circuit element functional block 206. Generally, any circuit element that can be programmed or otherwise configured and produce a known current, voltage, and/or measureable and repeating behavior (e.g., a rise or fall of a signal, rise/fall time/slope of a signal, and/or another signal behavior) can be used instead of memristors. For example, analog circuit element functional block 206 can include phase-change elements, programmable metallization cells, variable capacitors, etc.—possibly in a different arrangement or connectivity than that shown in FIG. 4B, but otherwise able to perform the operations described herein.

Computational functional block 302 in analog circuit element functional block 206 is a functional block that performs operations for processing instances of input data through the neural network and other operations. In some embodiments, computational functional block 302 includes general-purpose circuit elements and functional blocks for performing operations such as evaluation of activation functions for nodes using internal values determined using the analog circuit elements in circuit element functional block 300, computation of outputs from output nodes of the neural network for instances of input data, computation of error values associated with output values for instances of input data, computation of weight adjustment values, implementation of weight adjustments in the array of analog circuit elements (e.g., adjustments of conductances), etc. In some embodiments, computational functional block 302 includes purpose-specific or dedicated circuit elements for performing some or all of these operations, possibly including hardware circuits that are configured to perform the operations without executing program code.

Routing functional block 304 is a functional block that performs operations for routing information from circuit element functional block 300 to computational functional block 302 and possibly to other functional blocks in system 200. For example, routing functional block 304 may include switches, buffers, controllers, routes, etc. for communicating internal values for nodes in the neural network from circuit element functional block 300 to computational functional block 302 and/or for communicating weight values/conductances from computational functional block 302 to circuit element functional block 300 when updating conductances of memristors.

Returning to FIG. 2, controller functional block 208 is a functional block that performs operations for controlling where iterations of a training operation for a neural network are performed in system 200. During operation, controller functional block 208 moves the training operation from processor functional block 202 to analog circuit element functional block 206, so that initial iterations are performed in processor functional block 202 and remaining iterations are performed in analog circuit element functional block 206. Moving the training operations enables system 200 to take advantage of benefits associated with performing iterations of the training operation in each of processor functional block 202 and analog circuit element functional block 206. For example, performing initial iterations of the training operation in processor functional block 202 is beneficial because processor functional block 202 can use higher precision data values and produce higher precision results (i.e., higher precision than analog circuit element functional block 206), which can result in less iterations being required to train neural networks. As another example, because larger changes in weights are made in the neural network in the initial iterations, avoiding the use of analog circuit element functional block 206 for the initial iterations avoids the need to for making larger changes in conductance in the programmable elements (e.g., memristors) of analog circuit element functional block 206. Because, in some embodiments, the programmable elements wear with use (and eventually wear to the point of being unreliable), avoiding larger changes to conductances keeps the programmable elements operational for longer. As yet another example, processor functional block 202 reads neural network data from memory and writes neural network data to memory, and memory accesses, which are relatively slow, slow the performance of the initial iterations down. By performing the remaining iterations in analog circuit element functional block 206, the described embodiments avoid the need to access memory, which provides a significant speed-up relative to performing iterations in processor functional block 202. As yet another example, although the analog values determined in analog circuit element functional block 206 are lower-precision than values used in processor functional block 202, the remaining iterations are performed later in the training operation, when higher precision values would have less impact—and lower precision values therefore suffice.

In some embodiments, processor functional block 202 performs the initial iterations of a neural network training operation as described above. As the training progresses through the initial iterations, the weights in the neural network become better adjusted for performing the specified task for the neural network (e.g., image recognition, image generation, etc.) and the errors in outputs produced by the neural network consequently grow smaller. Controller functional block 208 monitors error values for outputs produced by the neural network while processor functional block 202 performs the initial iterations. When the error value—or a value based thereon, such as a running average or mean for a last N results, etc.—is less than a threshold, controller functional block 208 moves the training iterations from processor functional block 202 to analog circuit element functional block 206. For this operation, controller functional block 208 signals computational functional block 302 (or another entity) to perform the transfer, which involves configuring analog circuit element functional block 206 to perform the remaining iterations of the training operations based on a present state of the neural network. In other words, as part of moving training iterations from processor functional block 202, controller functional block 208 causes computational functional block 302 in analog circuit element functional block 206 to configure programmable elements, e.g., to set conductances of memristors, based on the weights for directed edges in the neural network, thereby preparing the programmable elements for subsequent operations.

In some embodiments, system 200 is included in an "accelerator," which is a functional block for performing training operations for a neural network—and which may be purpose-specific and configured for performing the training operations (i.e., may not perform general computing operations such as executing program code for an operating system or application program, etc.). In these embodiments, the accelerator may be included in an electronic device that also includes CPUs, GPUs, etc. for performing other types of operations. In some embodiments, some of the functional blocks shown in system 200 are included in the accelerator, while others of the functional blocks are separate from the accelerator. For example, memory functional block 204 may be "main memory" in a computing device in which the accelerator is included—and the accelerator may read data from and write data to main memory when performing the initial iterations, etc.

System 200 is simplified for illustrative purposes. In some embodiments, however, system 200 includes additional or different functional blocks, subsystems, and/or elements—or is included in a device that has additional or different functional blocks, subsystems, and/or elements. For example, system 200 or the device may include display subsystems, power subsystems, input-output (I/O) subsystems, etc. Generally, system 200 includes sufficient functional blocks, etc. to perform the operations herein described.

System 200 can be, or can be included in, any device that performs computational operations. For example, system 200 can be, or can be included in, a server computer, a desktop computer, a laptop computer, a wearable computing device, a tablet computer, a piece of virtual or augmented reality equipment, a smart phone, an artificial intelligence (AI) or machine learning device, a network appliance, a toy, a piece of audio-visual equipment, a home appliance, a vehicle, etc., and/or combinations thereof.

Performing Iterations During a Training Operation for a Neural Network

Figure 5:
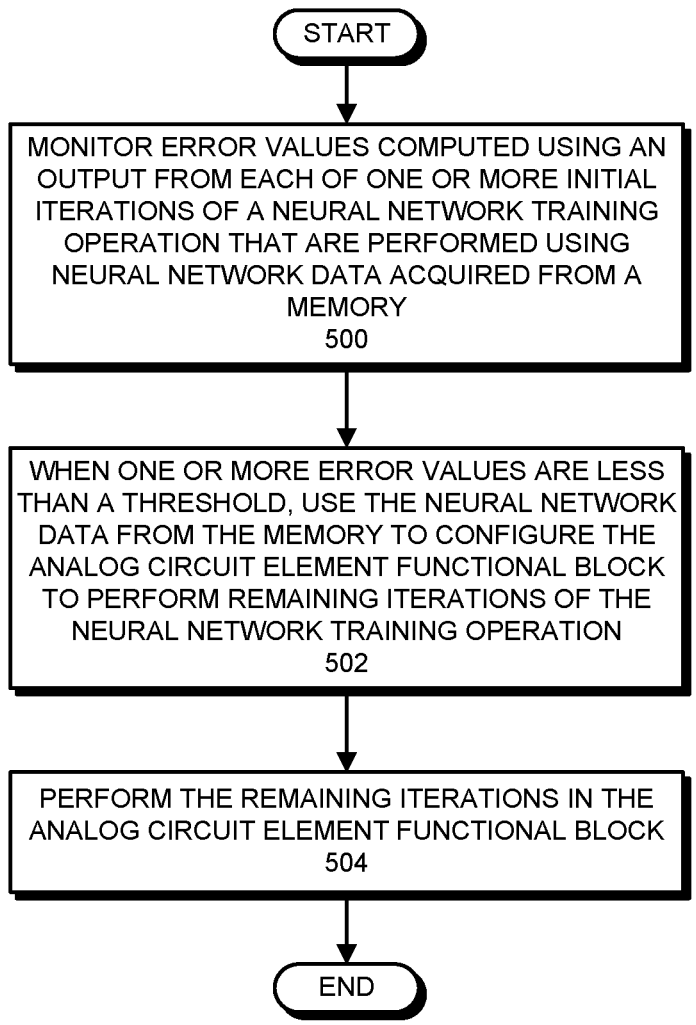
FIG. 5 presents a flowchart illustrating a process for using a processor and memory and an analog circuit element functional block for performing iterations during training operations for a neural network in accordance with some embodiments.

In the described embodiments, a processor and a memory (e.g., processor functional block 202 and memory functional block 204) and an analog circuit element functional block (e.g., analog circuit element functional block 206) perform iterations during training operations for a neural network. FIG. 5 presents a flowchart illustrating a process for using a processor and memory and an analog circuit element functional block for performing iterations during training operations for a neural network in accordance with some embodiments. Note that the operations shown in FIG. 5 are presented as a general example of operations performed by some embodiments. The operations performed by other embodiments include different operations, operations that are performed in a different order, and/or operations that are performed by different entities or functional blocks.

In describing FIG. 5, processing an instance of input data through the neural network is described in each of a processor and a memory and an analog circuit element functional block. Generally, when processing an instance of input data through the neural network, input values are first determined for the instance of input data and the input values are provided as inputs to input nodes in the neural network. For instance, when the instance of input data is an image (i.e., for a neural network that performs image recognition), each input node may be provided with values representing the colors of one or more respective pixels from the image. A result of an activation function (e.g., a rectified linear unit (ReLU) function, a hyperbolic tan (tanh) function, a soft-step/logistic function, etc.) for each input node is computed using the respective input values and the results are forwarded to one or more intermediate nodes in the neural network. The weighted input values for intermediate nodes are then computed based on the results from the input nodes and weights associated with corresponding directed edges. The weighted input values are next summed to determine an internal value for each of the intermediate nodes. The internal values are then used to compute a result of an activation function for each intermediate node (e.g., a rectified linear unit (ReLU) function, a hyperbolic tan (tanh) function, a soft-step/logistic function, etc.) and the results are forwarded to downstream intermediate nodes. These operations in the intermediate nodes are repeated until reaching the last layer of intermediate nodes, from which the results are forwarded to output nodes and used to produce the output from the neural network. For example, and continuing the image recognition example above, the output from the neural network may be a value that indicates whether (or not) an image is likely to include a desired image element (e.g., a face, a dog, a particular number, etc.), such as being a value from 0, for very unlikely to include the element, to 1, for very likely to include the element.

The operations in FIG. 5 start when a controller monitors error values computed using an output from each of one or more initial iterations of a neural network training operation that are performed using neural network data acquired from a memory (step 500). For each of the initial iterations of the neural network training operation, the processor processes an instance of input data through the neural network to generate an output from the neural network using operands and results having a specified precision (in terms of the number of bits used for operands and results). More specifically, the processor executes program code of the specified precision that causes the processor to acquire neural network data such as weight values, instances of input data, result values, etc. from the memory and use the acquired neural network data to process the instance of input data through the neural network to generate the output. The processor then computes an error value based on the output and an expected output associated with the corresponding instance of input data. For example, the processor may compute the error value using mean squared error (MSE) or another algorithm. The controller acquires the error value from the processor and monitors the error value by comparing the error value to a specified threshold.

In some embodiments, monitoring the error value comprises monitoring a single error value, e.g., a most recent error value. In some embodiments, however, monitoring the error value comprises monitoring a combination or sequence of error values and/or a relationship between two or more error values. For example, when monitoring the error value, the controller may monitor a moving average error value that is computed using the last N error values (e.g., 100, 1000, etc.). As another example, when monitoring the error value, the controller may monitor a trend or a difference (e.g., relative values, difference, etc.) in some of all of a sequence of two or more error values. In some embodiments, the controller pre-processes or filters error values to discard or smooth error values, such as error values that are more than a given value above or below an average error value, etc.

The threshold used for the operations in FIG. 5 is set to a value that balances or otherwise relates the benefits and detriments of using the processor and the memory or the analog circuit element functional block for performing iterations during the training operations. In other words, the threshold is set so that the benefits/detriments of using the processor and memory to perform the initial iterations are balanced against, or have another relationship with, the benefits/detriments of using the analog circuit element functional block to perform the remaining iterations. For example, a benefit of using the processor and memory is the precision (in terms of bits) of operands and results, while some benefits of using the analog circuit element functional block are relatively high-speed operations and lower electrical power consumption. These benefits are balanced against one another in view of the detriments of using the processor and memory, e.g., lower-speed processing and higher electrical power consumption, and the detriments of using the analog circuit element functional block, e.g., wear on analog circuit elements. When the threshold is set properly, therefore, the system moves the processing from the processor and memory to the analog circuit element functional block so that advantage can be taken of the benefits while also avoiding detriments. In some embodiments, the threshold is set by a user or other entity (e.g., an operating system, an application program, firmware, the controller, etc.), determined based on historical performance while training neural networks, estimated or assumed, set and possibly updated by the controller based on one or more rules or guidelines, etc. In some embodiments, the threshold is dynamically set and/or updated, such as setting and/or updating the threshold based on one or more runtime conditions (i.e., as the system starts up and subsequently operates).

When one or more error values are less than the threshold, the controller uses the neural network data from the memory to configure the analog circuit element functional block to perform remaining iterations of the neural network training operation (step 502). During this operation, the controller prepares/sets up the array of analog circuit elements and other processing circuitry in the analog circuit element functional block for processing of instances of input data for the remaining iterations of the training operation. For example, the controller can, set, for programmable elements in the array of analog circuit elements in the analog circuit element functional block, conductances or other values or parameters based at least in part on weight values associated with directed edges from the neural network data. In other words, the controller determines, using an algorithm, a table, rules/guidelines, etc., the locations of programmable elements in the array of programmable elements that are to be associated with each node of the neural network and configures the conductances or other values or parameters using the weight values from the neural network data. In some embodiments, the controller uses one or more algorithms, rules, tables, etc. for converting the weight values in the neural network data to conductances or other values, parameters, etc. In embodiments in which the programmable elements are memristors, this operation includes driving a specified voltage and current through each memristor for a corresponding amount of time so that the conductances of the memristors are set. When step 502 is complete, the programmable elements and other circuit elements in the array of analog circuit elements are prepared to perform their parts in determining internal values for corresponding nodes in the neural network. In addition, other functional blocks in analog circuit element functional block are configured for performing other operations for processing instances of input data through the neural network and adjusting neural network data based thereon.

The controller then causes the analog circuit element functional block to perform the remaining iterations (step 504). As described in more detail above, this operation involves causing a circuit element functional block, a computational functional block, and a routing functional block in analog circuit element functional block to perform operations for processing instances of input data through the neural network and backpropagating error values through the neural network to adjust neural network data (e.g., weight values, etc.). In some embodiments, the analog circuit element functional block continues processing instances of input data for the remaining iterations until reaching a stopping threshold, such as a magnitude of updates to conductances or weights, a magnitude of error values, etc.

When the training operations are complete, i.e., after the analog circuit element functional block reaches the stopping threshold, the neural network has reached a trained state in which the neural network is trained to perform specified tasks. Continuing the example above in which the specified task is image recognition, this can mean that the neural network is prepared to perform image recognition on unknown images to identify whether the unknown images include particular image elements (e.g., cars, faces, etc.). In some embodiments, this means performing the specified task itself using the analog circuit element functional block. In some embodiments, however, the neural network data is acquired from the analog circuit element functional block and used to configure other functional blocks to perform the specified task. For example, the processor functional block may be provided the neural network data and then used to perform the specified task. In some embodiments, training is an ongoing process—and may continue at least in part as the neural network performs the specified task.

In some embodiments, when performing the remaining iterations in the analog circuit element functional block, the controller also performs one or more power-saving operations. For example, the controller can place one or both of the processor and the memory in a lower power operating mode, such as by reducing a clock frequency for a controlling clock for one or both of the processor and the memory or a portion thereof (e.g., memory circuits, processing circuits, etc.), reducing a supply voltage for one or both of the processor and the memory or a portion thereof (possibly to 0 V), etc.

In some embodiments, a system (e.g., system 200 and/or some portion thereof) uses code and/or data stored on a non-transitory computer-readable storage medium to perform some or all of the operations herein described. More specifically, the system reads the code and/or data from the computer-readable storage medium and executes the code and/or uses the data when performing the described operations. A computer-readable storage medium can be any device, medium, or combination thereof that stores code and/or data for use by a system. For example, the computer-readable storage medium can include, but is not limited to, volatile and/or non-volatile memory, including flash memory, random access memory (e.g., eDRAM, RAM, SRAM, DRAM, DDR4 SDRAM, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more processors/cores/central processing units (CPUs), application-specific integrated circuit (ASIC) chips, field-programmable gate arrays (FPGAs), compute units, embedded processors, graphics processors (GPUs)/graphics cores, pipelines, accelerated processing units (APUs), functional blocks, controllers, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., system 200, controller functional block 208, circuit element functional block 300, and/or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the system performs a first operation, a second operation, etc.," the system performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A system that performs training operations for a neural network, comprising:
a processor;
a memory;
an analog circuit element functional block that includes an array of analog circuit elements; and
controller circuits;
wherein the processor is configured to perform initial iterations of a neural network training operation, each initial iteration including using neural network data acquired from the memory for processing a corresponding instance of input data through the neural network to generate an output of the neural network;
wherein the controller circuits are configured to:
monitor error values computed using the outputs from the initial iterations;
when one or more error values are less than a threshold, switch from using the processor to using the analog circuit element functional block for performing remaining iterations of the neural network training operation, the switching including setting conductances of programmable elements in the array of analog circuit elements based at least in part on a value of respective neural network data; and
cause the analog circuit element functional block to perform the remaining iterations, the performing including, for each remaining iteration, using the conductances of the programmable elements for computing an output of the neural network and updating the conductances of the programmable elements based on the output of the neural network.

2. The system of claim 1, wherein, when performing each of the initial iterations, the processor is configured to:
determine an error value based on the output and an expected output associated with the corresponding instance of input data; and
backpropagate the error value through the neural network and make associated updates to some or all of the neural network data, the making the updates including storing updated neural network data in the memory.

3. The system of claim 2, wherein, when processing instances of input data in the neural network during the initial iterations, the processor uses a specified precision for operands and results of operations.

4. The system of claim 1, wherein using the conductances of the programmable elements for computing an output of the neural network and updating the conductances of the programmable elements based on the output of the neural network includes:
processing a corresponding instance of input data in the neural network to compute an output from the neural network, the processing including computing internal values for nodes in the neural network using respective electrical currents from the programmable elements in the array of analog circuit elements, the electrical currents from each programmable element in the array of analog circuit elements being proportional to a conductance of that element;
determining an error value based on the output and an expected output associated with the corresponding instance of input data; and
backpropagating the error value through the neural network and making associated updates to conductances of the programmable elements in the array of analog circuit elements based at least in part on the error value.

5. The system of claim 4, wherein performing the remaining iterations comprises performing individual remaining iterations until a stopping threshold is reached in magnitude of updates to conductances or in error values.

6. The system of claim 1, wherein, when the neural network has been trained using the training operations, the system is configured to use the neural network to perform one or more specified tasks for unknown instances of input data.

7. The system of claim 1, wherein the neural network data comprises values representing weights associated with directed edges between nodes in the neural network.

8. The system of claim 1, wherein the threshold is set to a given value based at least in part on an estimated wear on the analog circuit elements in the array of analog circuit elements from performing the remaining operations.

9. The system of claim 1, wherein the controller circuits transition the memory to a lower-power mode while the analog circuit element functional block performs the remaining iterations.

10. A method for performing training operations for a neural network in a system that includes a processor, a memory, and an analog circuit element functional block with an array of analog circuit elements, the method comprising:
performing, by the processor, initial iterations of a neural network training operation, each initial iteration including using neural network data acquired from the memory for processing a corresponding instance of input data through the neural network to generate an output of the neural network;
monitoring error values computed using the outputs from the initial iterations of a neural network training operation;
when one or more error values are less than a threshold, switching from using the processor to using the analog circuit element functional block for performing remaining iterations of the neural network training operation, the switching including setting conductances of programmable elements in the array of analog circuit elements based at least in part on a value of respective neural network data; and
performing, in the analog circuit element functional block, the remaining iterations, the performing including, for each remaining iteration, using the conductances of the programmable elements for computing an output of the neural network and updating the conductances of the programmable elements based on the output of the neural network.

11. The method of claim 10, wherein performing each of the initial iterations comprises:
determining an error value based on the output and an expected output associated with the corresponding instance of input data; and
backpropagating the error value through the neural network and making associated updates to some or all of the neural network data, the making the updates including storing updated neural network data in the memory.

12. The method of claim 11, wherein processing instances of input data in the neural network during the initial iterations comprises using a specified precision for operands and results of operations.

13. The method of claim 10, wherein using the conductances of the programmable elements for computing an output of the neural network and updating the conductances of the programmable elements based on the output of the neural network includes:
- processing a corresponding instance of input data in the neural network to compute an output from the neural network, the processing including computing internal values for nodes in the neural network using respective electrical currents from the programmable elements in the array of analog circuit elements, the electrical currents from each programmable element in the array of analog circuit elements being proportional to a conductance of that element;
- determining an error value based on the output and an expected output associated with the corresponding instance of input data; and
- backpropagating the error value through the neural network and making associated updates to conductances of the programmable elements in the array of analog circuit elements based at least in part on the error value.

14. The method of claim 13, wherein performing the remaining iterations comprises performing individual remaining iterations until a stopping threshold is reached in a magnitude of updates to conductances or error values.

15. The method of claim 10, further comprising:
- when the neural network has been trained using the training operations, use the neural network to perform one or more specified tasks for unknown instances of input data.

16. The method of claim 10, wherein the neural network data comprises values representing weights associated with directed edges between nodes in the neural network.

17. The method of claim 10, wherein the threshold is set to a given value based at least in part on an estimated wear on the analog circuit elements in the array of analog circuit elements from performing the remaining operations.

18. The method of claim 10, further comprising:
- transitioning the memory to a lower-power mode while the analog circuit element functional block performs the remaining iterations.

\* \* \* \* \*